United States Patent
Maertens et al.

(10) Patent No.: US 9,988,963 B2
(45) Date of Patent: Jun. 5, 2018

(54) METHOD FOR MONITORING AN OXIDATION CATALYSIS DEVICE

(71) Applicants: CONTINENTAL AUTOMOTIVE FRANCE, Toulouse (FR); CONTINENTAL AUTOMOTIVE GmbH, Hannover (DE)

(72) Inventors: Steven Maertens, Toulouse (FR); Brice Hembert, Arnaud-Guilhem (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 224 days.

(21) Appl. No.: 14/968,179

(22) Filed: Dec. 14, 2015

(65) Prior Publication Data
US 2016/0169076 A1    Jun. 16, 2016

(30) Foreign Application Priority Data
Dec. 15, 2014    (FR) .................................. 14 62429

(51) Int. Cl.
*F01N 11/00*    (2006.01)
*B01D 53/94*    (2006.01)
(Continued)

(52) U.S. Cl.
CPC .......... *F01N 11/002* (2013.01); *B01D 53/944* (2013.01); *F01N 3/103* (2013.01);
(Continued)

(58) Field of Classification Search
CPC ...... F01N 11/002; F01N 3/103; F01N 13/008; F01N 2550/02; F01N 3/035;
(Continued)

(56) References Cited

U.S. PATENT DOCUMENTS 9,616,387 B2 *   4/2017   Eager ................. B01D 53/9495
2003/0046929 A1   3/2003   Terada et al.
(Continued)

FOREIGN PATENT DOCUMENTS

CN    1405435 A    3/2003
CN    1989320 A    6/2007
(Continued)

OTHER PUBLICATIONS

French Search Report, dated Aug. 28, 2015, from corresponding French Application.

*Primary Examiner* — Manish S Shah
*Assistant Examiner* — Suman K Nath
(74) *Attorney, Agent, or Firm* — Young & Thompson

(57) ABSTRACT

A method for monitoring an oxidation catalysis device or DOC arranged in an exhaust line of an internal combustion engine of a vehicle, in a predetermined range of inlet (2) and outlet (3) temperatures of the DOC, includes injecting predetermined successive quantities of fuel in stages (5, 6) into the inlet of the DOC, recording the outlet (3) temperature of the DOC after each injected quantity of fuel, recording the total quantity injected for a given stage, for which the outlet temperature (3) of the DOC begins to decrease, determining a characterization of the DOC monitored, then comparing this characterization with a test characterization of a similar DOC which has been established beforehand in order to determine a threshold degradation of the DOC monitored that is not to be exceeded.

14 Claims, 1 Drawing Sheet

(51) Int. Cl.
*F01N 3/10* (2006.01)
*F01N 13/00* (2010.01)
*F02D 41/02* (2006.01)
*F02D 41/40* (2006.01)
*F01N 3/035* (2006.01)

(52) U.S. Cl.
CPC ......... *F01N 13/008* (2013.01); *F02D 41/025* (2013.01); *F02D 41/405* (2013.01); *F01N 3/035* (2013.01); *F01N 3/101* (2013.01); *F01N 2430/085* (2013.01); *F01N 2550/02* (2013.01); *F01N 2560/06* (2013.01); *F01N 2610/03* (2013.01); *F01N 2900/0412* (2013.01); *F01N 2900/0416* (2013.01); *F01N 2900/08* (2013.01); *F01N 2900/1404* (2013.01); *Y02T 10/22* (2013.01); *Y02T 10/26* (2013.01); *Y02T 10/44* (2013.01); *Y02T 10/47* (2013.01)

(58) Field of Classification Search
CPC ......... F01N 2610/03; F01N 2900/0412; F01N 3/101; F01N 2560/06; F01N 2900/0416; F01N 2900/08; F02D 41/025; F02D 41/405; B01D 53/944; Y02T 10/22; Y02T 10/47; Y02T 10/26; Y02T 10/44

USPC ...................................................... 73/114.75
See application file for complete search history.

(56) References Cited

U.S. PATENT DOCUMENTS

| | | | |
|---|---|---|---|
| 2008/0060347 | A1 | 3/2008 | Tominaga et al. |
| 2009/0082938 | A1 | 3/2009 | Onodera et al. |
| 2010/0242459 | A1 | 9/2010 | Tsujimoto et al. |
| 2011/0011063 | A1* | 1/2011 | Tsujimoto ............... F01N 3/025 60/286 |
| 2011/0099984 | A1* | 5/2011 | Otsubo .................... F01N 3/20 60/286 |

FOREIGN PATENT DOCUMENTS

| | | |
|---|---|---|
| CN | 101223347 A | 7/2008 |
| CN | 101878353 A | 11/2010 |
| EP | 1 323 905 A1 | 7/2003 |
| EP | 2 216 522 A1 | 8/2010 |
| FR | 2 917 123 A1 | 12/2008 |
| JP | 2014-20269 A | 2/2014 |
| WO | 2014016597 A1 | 1/2014 |

* cited by examiner

METHOD FOR MONITORING AN OXIDATION CATALYSIS DEVICE

FIELD OF THE INVENTION

The present invention relates to a method for monitoring an oxidation catalysis device arranged in an exhaust line of an internal combustion engine of a vehicle, said method being activated while the internal combustion engine is in operation.

BACKGROUND OF THE INVENTION

An oxidation catalysis device, also referred to as a DOC device or DOC, standing for "diesel oxidation catalyst", is a device placed in the exhaust line of a diesel-engined vehicle, as far as possible as close as possible to the engine so that it reaches its operating temperature of between 150° C. and 200° C. as quickly as possible, and which uses the oxygen of several of the components of the exhaust gas to perform oxidation, notably via the following three oxidation reactions:
 oxidation of carbon monoxide (CO),
 oxidation of hydrocarbons (HC),
 oxidation of an organic fraction of the diesel particulates (SOF).

An oxidation catalysis device in an exhaust line generally assumes at least three main functionalities, which are:
1. converting CO and HC into carbon dioxide ($CO_2$) and water ($H_2O$),
2. creating an exothermal reaction for a determined length of time so as to regenerate a particulate filter positioned downstream of the DOC device in an exhaust line, where appropriate, and
3. oxidizing as much nitrogen monoxide (NO) as possible to convert it into nitrogen dioxide ($NO_2$) in order to make a device of SCR (selective catalytic reduction) type positioned downstream in the exhaust line, where appropriate, more effective.

Legislative requirements in a great many countries demand the monitoring of the functionalities of a DOC device while it is in use, particularly the functionality of converting carbon monoxide (CO) and/or hydrocarbons into carbon dioxide ($CO_2$) and water ($H_2O$).

Document EP2216522A1 discloses a method for monitoring an oxidation catalytic converter placed in an exhaust line of an internal combustion engine, in which method a diagnosis of the catalytic converter involves a test cycle during which the ability of the oxidation catalytic converter to convert hydrocarbons (HC) is determined on the basis of a temporary exothermal reaction generated by the post-injection of a given quantity of fuel into the catalytic converter. The exothermal reaction obtained is then compared against an expected correct exothermal reaction model, in order to establish a diagnosis of the oxidation catalytic converter as part of the OBD (which stands for on-board diagnostics).

Such a method has the chief disadvantage that its efficiency is dependent on the accuracy of the model and on the spread of the parameters used in the model, notably the quantity of fuel injected, the flow rate of the gases, the catalyst, leading to a spread in the temperature estimates themselves.

SUMMARY OF THE INVENTION

The present invention proposes an alternative solution of a method for monitoring an oxidation catalysis device with a view to establishing a diagnosis relating to the degradation thereof as oxidation catalytic converter, as part of the OBD (on board diagnostics) procedures.

More specifically, the invention consists in a method for monitoring an oxidation catalysis device arranged in an exhaust line of an internal combustion engine of a vehicle, characterized in that it comprises the following steps:
 Said monitoring method is activated during operation of the internal combustion engine in a predetermined range of inlet and outlet temperatures of the oxidation catalysis device,
 Within said predetermined range of inlet temperatures, predetermined successive quantities of fuel are injected in stages at the inlet of said oxidation catalysis device, a predetermined quantity of fuel being injected for each stage, said predetermined quantity of fuel being greater than the quantity injected in the preceding stage,
 The outlet temperature of said oxidation catalysis device is recorded after each predetermined quantity of fuel injected per stage,
 The total quantity injected for a given stage, for which the outlet temperature of the oxidation catalysis device begins to decrease is recorded, this event determining a characterization of said oxidation catalysis device monitored,
 Said determined characterization of the oxidation catalysis device monitored is then compared against a test characterization of a similar oxidation catalysis device which has been established beforehand in order to determine a threshold degradation of the oxidation catalysis device monitored that is not to be exceeded, then a diagnosis is established as follows:
  If said determined characterization puts said oxidation catalysis device monitored beyond said degradation threshold that is not to be exceeded, then a diagnosis of a malfunctioning of the oxidation catalysis device is flagged up in the vehicle, and
  If said determined characterization puts said oxidation catalysis device monitored under or at said degradation threshold that is not to be exceeded, then the diagnosis made is that the oxidation catalysis device is operational.

The method according to the invention proposes monitoring a decrease in the temperature as an exothermal reaction progresses following a plurality of injections of fuel in respective stages, and therefore monitoring an operating point by comparing it against an operating point derived from a test conducted on a similar but aged oxidation catalysis device. As a result, the margin of error is relatively small, the reference having been taken from an experimental reality rather than a model, and comparison with a view to diagnosing becomes easy. When the temperature of the cumulative exothermal reaction decreases that means that the catalysis device being monitored and tested is no longer capable of converting the corresponding injected quantity of fuel, and all that is then required is for this quantity of fuel to be compared against the quantity that brings about a decrease in temperature in a catalysis device that is similar but that has been aged in a controlled way, so as for example to find itself at an acceptable limit of degradation, which still has to be defined by simple tests according to need, for example according to compliance with given legislation, in order to be able to diagnose whether or not the device being monitored and tested can still be considered to be operational. What is meant by a similar oxidation catalysis device here is a catalysis device of the same model and having the same characteristics at the outset as the one that is being monitored and tested, namely when new prior to any use. The inlet temperature of the catalysis device being monitored can be determined in the known way by modeling or by measurement using a temperature sensor. Provided the inlet temperature of the catalysis device is conformed to, the method according to the invention can be executed with the engine operating with a stable exhaust flow rate or in any engine operating mode, using a model of the outlet temperature of the catalysis device. The two solutions can be used together. A model of the outlet temperature of the catalysis device will make it possible to differentiate a phenomenon whereby the outlet temperature of the catalysis device decreases as a result of the vehicle accelerating leading to an increase in exhaust gas flow rate from a phenomenon whereby the outlet temperature of the catalysis device decreases as a result of the method according to the invention, using a simple difference from the measured temperature at the outlet of the catalysis device. Such a model of the outlet temperature of the catalysis device is known from an engine control unit and can be based on a flowmeter measuring the inlet flow rate of gases into the engine, a torque demand indicator or the fuel injection system. The stability of the exhaust gas flow rate is moreover monitored and known in an internal combustion engine by the engine control unit.

According to one advantageous feature, said test characterization determines a total test quantity of fuel injected into a similar oxidation catalysis device which corresponds to said threshold degradation of the oxidation catalysis device monitored that is not to be exceeded.

According to one advantageous feature, a scale of diagnosed degradation of the oxidation catalysis device monitored is established as a function of a quantification of the difference between the determined characterization and the test characterization, so that a measure of the degradation of the oxidation catalysis device monitored can be provided in the vehicle.

This feature allows the owner of the vehicle or the user thereof to be supplied with information relating to the imminence, as appropriate, of necessary maintenance to the vehicle DOC system, and gives him time for work to be done on the oxidation catalysis system of the vehicle.

According to one advantageous feature, a predetermined quantity of fuel injected into the exhaust line is obtained by dividing said test quantity into a plurality of divided quantities, the value of which is defined as a function of the desired fineness of the degradation diagnostics.

This feature makes it possible to define a precision or resolution of the monitoring method according to the invention which corresponds to said basic divided quantity of the test quantity.

According to one advantageous feature, in each stage, the total quantity of fuel injected at the preceding stage is incremented by one said basic divided quantity.

According to this feature, the quantity of fuel injected for the first stage may for example be equal to said basic divided quantity, the quantity of fuel injected for the second stage that follows on from the first may for example be equal to twice the basic divided quantity and so on, at each stage adding one basic divided quantity to the quantity of fuel injected for the preceding stage.

According to one advantageous feature, said total test quantity of fuel injected into a similar oxidation catalysis device which corresponds to the degradation threshold of the oxidation catalysis device monitored that is not to be exceeded is implemented in an electronic control unit of the vehicle.

According to one advantageous feature, the establishing of said total test quantity of fuel injected into a similar oxidation catalysis device involves the following steps:

The similar oxidation catalysis device is caused to age, to a degradation limit the reference of which is sought in order to establish said threshold degradation of the oxidation catalysis device monitored that is not to be exceeded in said comparison step, The total quantity of fuel injected into said similar oxidation catalysis device, at this degradation limit, beyond which the outlet temperature of the oxidation catalysis device will decrease, for a given range of catalysis device inlet temperatures, and which defines said total test quantity of fuel is then recorded.

The sought-after aging of an oxidation catalysis device identical at the outset to the one being monitored and tested is, for example, achieved by running an identical vehicle, or with an engine test bed or in an oven, for a given time and at a given temperature. The aging thus obtained in a controlled manner may for example be indicative of operation at the limit of operational conditions for the conversion of HC, which meets a given emission standard. The total test quantity of fuel is obtained for example by injecting predetermined successive quantities of fuel per stage. A test characterization of the device monitored is thus obtained via a total test quantity of fuel.

According to one advantageous feature, the method according to the invention is activated intrusively.

What is meant here by intrusively is forced activation of the specific method with a view to testing the oxidation catalysis device monitored, by injecting quantities of fuel in stages in post-injection for example, in a predetermined range of inlet temperatures of the oxidation catalysis device monitored. For example, the method according to the invention can be activated intrusively at the start of regeneration of a particulate filter. Post injection means injecting fuel for example at the end of combustion or at the start of exhaust so that the fuel thus injected does not burn in the combustion chamber.

According to one advantageous feature, said temperature recorded at the outlet of said oxidation catalysis device and which begins to decrease is comprised between 150° C. and 350° C.

The present invention also relates to a device for monitoring the degradation of an oxidation catalysis device arranged in an exhaust line of an internal combustion engine of a vehicle, comprising an oxidation catalysis device, means for successively injecting predetermined quantities of fuel in stages into the exhaust line, means for measuring the temperature at the outlet of said oxidation catalysis device, means for determining the inlet temperature of said oxidation catalysis device, characterized in that it comprises means for implementing the steps of a method according to the invention.

BRIEF DESCRIPTION OF THE DRAWINGS

Other features and advantages will become apparent from reading about exemplary embodiments of a method and a device according to the invention in what follows, accompanied by the attached drawings, which examples are given by way of non limiting illustration, and in which.

DETAILED DESCRIPTION OF THE INVENTION

Figure 1:
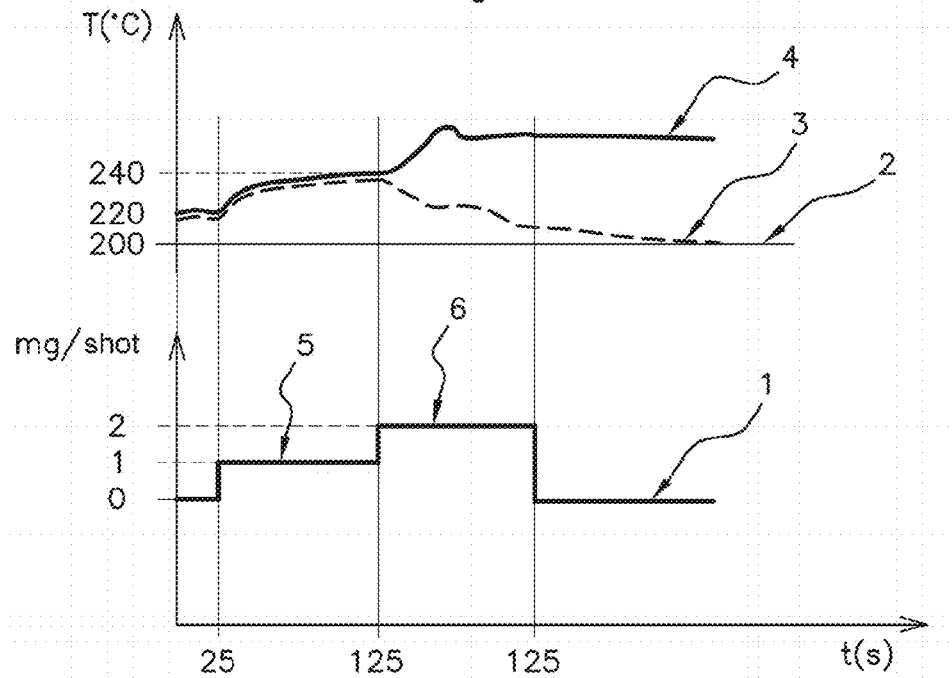
FIG. 1 is a diagram illustrating an exemplary embodiment of a method of monitoring the degradation of an oxidation catalysis device according to the invention.

The method illustrated in FIG. 1 is a method for monitoring according to the invention, applied to an oxidation catalysis device of known type arranged also in the known way in an exhaust line of an internal combustion engine of a vehicle, for example a turbocharged diesel engine comprising, from upstream to downstream starting from the engine: the turbine of the turbocharger, the oxidation catalysis device or DOC, a particulate filter or DPF (diesel particulate filter) and a selective catalytic reduction or SCR device, or with the order of the last two swapped over. In the absence of a turbo, the oxidation catalysis device or DOC is advantageously positioned directly downstream of the engine.

FIG. 1 shows how parameters indicative of the method of monitoring according to the invention evolve. The abscissa axis represents the time t in seconds, and the ordinate axis represents three scales of parameters, namely the inlet temperature of the oxidation catalysis device or DOC modeled or measured in degrees Celsius, the outlet temperature thereof which of necessity has to be measured, in degrees Celsius, and the quantity of fuel injected per stage in milligrams per shot (mg/st or mg/shot).

Curve 1 illustrates how the quantity of fuel injected per stage into the inlet of the oxidation catalysis device or DOC in service being monitored changes, curve 2 illustrates the evolution of the inlet temperature of the oxidation catalysis device or DOC in service being monitored, curve 3 illustrates the evolution of the outlet temperature of the oxidation catalysis device or DOC in service being monitored and curve 4 illustrates the evolution of the outlet temperature of the oxidation catalysis device or DOC similar to the one being monitored but used as a reference for the example, when new.

The monitoring method depicted via FIG. 1 comprises the following steps:

The monitoring method is activated during operation of the internal combustion engine in a predetermined range of inlet and outlet temperatures of the oxidation catalysis device, the outlet temperature being of the same order as the inlet temperature, for example around 200° C. for the inlet temperature and 220° C. for the outlet temperature as depicted by curves 2 and 3 at the time t=25 s, namely after waiting 25 seconds for example for inlet and outlet temperature stability;

In said predetermined range of inlet temperatures, namely at around 200° C. and at the time t=25 s in the example, a first predetermined quantity of fuel is injected into the inlet of the oxidation catalysis device, this quantity being equal for example to 1 mg/shot, namely 1 mg in one shot and into one cylinder, defining a first stage 5; this first predetermined quantity of fuel is, for example, injected from an injector of the engine, in a post-injection phase of the engine cycle so as not to burn in the combustion chamber, for example between 120° and 260° after top dead center (TDC) on the compression stroke, for example approximately 150° after TDC;

The temperature at the outlet of the oxidation catalysis device after this first predetermined quantity of fuel has been injected is then recorded, as shown by curve 3, which outlet temperature is monitored for a length of time necessary to achieve a complete exothermal reaction in the DOC; curve 3 in FIG. 1 shows an increase in this outlet temperature caused by the exothermal reaction that is to be considered to be normal by comparison with the curve 4 which experimentally shows the same evolution for a DOC that is similar but new;

Thereafter, still in the predetermined range of inlet temperatures, namely at 200° C. and at the time t=125 s in the example, having recorded no decrease in the outlet temperature of the DOC, a second predetermined quantity of fuel is injected into the inlet of the oxidation catalysis device, which quantity is greater than the first predetermined quantity of fuel, in the example equal to 2 mg/shot, defining a second stage 6; this second predetermined quantity of fuel is, like the first, for example injected from an injector of the engine, in a post-injection phase of the engine cycle so as not to burn in the combustion chamber;

The outlet temperature of the oxidation catalysis device after this second predetermined quantity of fuel has been injected is recorded again, as shown in curve 3, which outlet temperature is monitored for a length of time needed to achieve the corresponding complete exothermal reaction in the DOC; curve 3 in FIG. 1 shows a decrease in this outlet temperature from a temperature of around 240° C., shortly after the injection of the second quantity of fuel, this decrease being caused by the absence of a "normally" expected exothermal reaction, or a partially or completely absent reaction, which therefore has to be considered to be an anomaly as compared with the curve 4 which shows experimentally and for the present description only a normal evolution for a DOC that is similar but new and which indicates that, for such a quantity of fuel injected, the outlet temperature of the DOC ought to increase according to a normal exothermal reaction;

The total quantity injected in this second stage, for which the outlet temperature of the oxidation catalysis device begins to decrease, is thus recorded, this event determining a characterization of the oxidation catalysis device monitored;

This determined characterization of the oxidation catalysis device monitored is then compared against a test characterization (not depicted) of a similar oxidation catalysis device which has been established beforehand in order to determine a threshold degradation of the oxidation catalysis device monitored that is not to be exceeded, then a diagnosis is established as follows:

If the determined characterization puts the oxidation catalysis device monitored beyond the degradation threshold that is not to be exceeded, then a diagnosis of a malfunctioning of the oxidation catalysis device is flagged up in the vehicle, for example on the OBD system, and If the determined characterization puts the oxidation catalysis device monitored under or at the degradation threshold that is not to be exceeded, then the diagnosis made is that the oxidation catalysis device is operational.

The method as described hereinabove may advantageously be activated intrusively, for example at the start of regeneration of the particulate filter, for example in a post-injection phase of the engine cycle at a catalysis device inlet temperature of the order of 200° C. While the monitoring method described is being executed, the engine control unit will allow the stability of the exhaust gas flow rate to be monitored in a known way so that the monitoring method is run with the exhaust gases in a stable state, about a value that is substantially constant to within plus or minus 15% for example, to be determined by calibration. The monitoring method may be activated alternatively when the exhaust gases are in a non-stable state, provided that the inlet temperature of the DOC is complied with as explained above, using a model, known to those skilled in the art, of the outlet temperature of the catalysis device; this model will allow the sought-after decrease in temperature to be monitored according to the monitoring method described and taking into consideration the DOC outlet temperature given by the model for estimating the DOC outlet temperature according to the monitoring method described, which is done using the temperature sensor at the outlet of the catalysis device.

In the example of FIG. 1, the test characterization determines a total test quantity of fuel injected into a similar oxidation catalysis device which corresponds to the threshold degradation of the oxidation catalysis device monitored that is not to be exceeded. This test quantity is comprised between 1 and 2 mg/shot in the example of FIG. 1, since the outlet temperature of the DOC increases at 1 mg/shot and decreases at 2 mg/shot.

For preference, the temperature recorded at the outlet of the oxidation catalysis device (curve 3) is comprised between 150° C. and 350° C. when it begins to decrease, in order to make the decreasing-temperature phenomenon more visible. Specifically, the sought-after phenomenon of decrease in temperature at the outlet of the DOC may be less visible or non-existent at high DOC inlet temperatures. For example, for a high DOC inlet temperature of the order of 300° C., the DOC is more effective and therefore a greater quantity of fuel would need to be injected in order to be able to see any kink in outlet temperature. That means that for activating the method according to the invention, the DOC inlet temperature is preferably comprised between 150° C. and 250° C. The DOC startup temperature varies according to the quality and quantity of the materials used.

Advantageously, a scale of diagnosed degradation of the oxidation catalysis device monitored can be established as a function of a quantification of the difference between the determined characterization and the test characterization, so that a measure of the degradation of the oxidation catalysis device monitored can be provided in the vehicle.

That may consist in decreasing the increment of quantity of fuel injected from one stage to another in order to refine the precision of the diagnostics if necessary.

For preference, a predetermined quantity of fuel injected into the exhaust line is obtained by dividing the test quantity of fuel into a plurality of divided quantities, the value of which is defined as a function of the desired fineness of the degradation diagnostics.

In the example of FIG. 1, in each stage, the total quantity of fuel injected at the preceding stage is incremented by one basic divided quantity, which is equal to 1 mg/shot in the example. A test quantity of fuel may be comprised between 1 mg and 10 mg per shot and per cylinder, and more frequently between 5 and 7 mg per shot. Between the stages, it is necessary to observe a minimum period of time in which the exothermal reaction where appropriate is intended to take place, this lasting 30 seconds for example.

This total test quantity of fuel injected into a similar oxidation catalysis device which corresponds to the threshold degradation of the oxidation catalysis device monitored that is not to be exceeded is advantageously implemented in an electronic control unit of the vehicle, for example the engine control unit, so that this unit can swiftly proceed with the comparison step.

An example of a method for the preliminary establishing of the total test quantity of fuel injected into an oxidation catalysis device similar to the one that is monitored and tested will now be described with the aid of FIG. 2, this method comprising the following steps:

The similar oxidation catalysis device is caused to age, to a degradation limit the reference of which is sought in order to establish the threshold degradation of the oxidation catalysis device monitored that is not to be exceeded in the comparison step of the method described above with the aid of FIG. 1, The total quantity of fuel injected into the similar oxidation catalysis device, at this degradation limit, beyond which the outlet temperature of the oxidation catalysis device will decrease, and which defines the total test quantity of fuel is then recorded.

Figure 2:
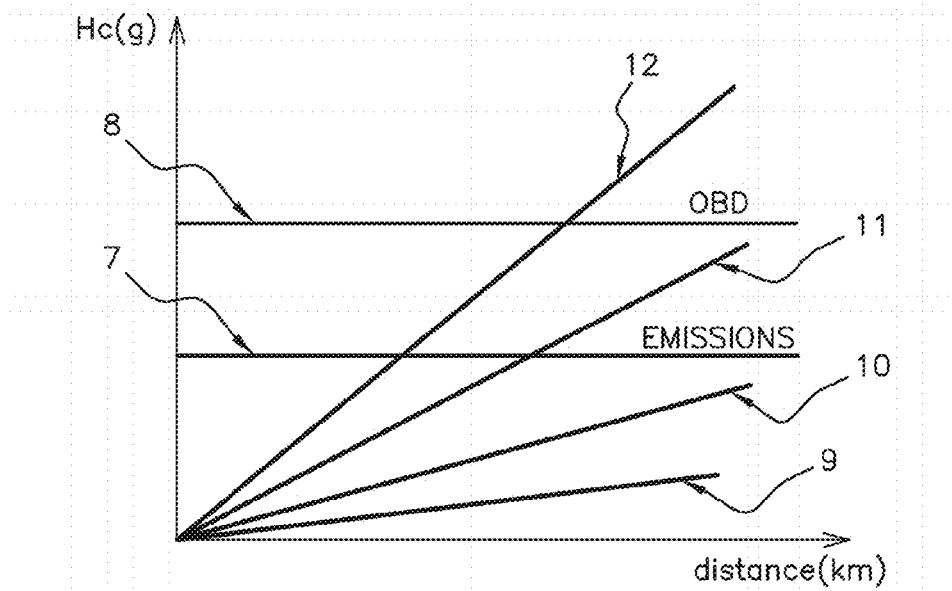
FIG. 2 is a state diagram of an oxidation catalysis device illustrating one example of a test characterization.

FIG. 2 depicts several curves 9, 10, 11, and 12 of the characterization of an oxidation catalysis device or DOC over its lifespan, relative to the emission of a number of unburnt hydrocarbons at the outlet of the DOC. Each curve represents a given state of the oxidation catalysis device. The abscissa axis carries a scale of distance covered in km, for example in an NEDC cycle lasting 1 200 seconds or an WLTC cycle lasting 1 800 seconds, and the ordinance axis carries a scale of quantity of hydrocarbons present after the oxidation catalysis device or DOC according to the state thereof considered. A first level 7 defines a maximum permissible quantity of hydrocarbons emissions present at the outlet of the DOC considered, or homologation emissions threshold, for example 90 mg per kilometer (deduced from the "THC+$NO_x$ and $NO_x$" threshold in the context of the euro 6 standard). A second level 8, higher than the first one 7, defines a hydrocarbons emissions threshold at the outlet of the DOC considered, which is no longer permissible and requires an immediate intervention alert or MIL (malfunctioning indicator lamp) to be illuminated on the instrument panel, this also being referred to as the OBD threshold and being, for example, 320 mg per kilometer, corresponding to the NMHC threshold ("non methane hydrocarbons" threshold in the context of the euro 6 standard).

In FIG. 2, curve 9 represents a characterization of the DOC device considered, when new. Curve 10 represents a characterization of the DOC device considered, aged but still operational. Curve 11 represents a characterization of the DOC device considered, aged to just below the OBD threshold. Curve 12 represents a characterization of the DOC device considered, aged beyond the OBD threshold and which must activate the MIL.

The level of aging of a DOC is dependent on time and temperature. These artificial agings can be obtained for example by passing the DOC through an oven for a given length of time and at a given temperature which are variable in order to obtain different levels of aging.

In the context of the present invention and according to the context given hereinabove in FIG. 2, the test characterization of the DOC device can be performed at the OBD threshold level if this reference level is to be taken, and for a given inlet temperature of the DOC at this stage of aging, the quantity of fuel injected into the latter, beyond which a decrease in DOC outlet temperature is observed, is measured. For example, it is determined in this way that a DOC device thus aged exhibits a temperature kink at 5 mg/shot. This quantity of fuel constitutes the total test quantity of fuel for the monitoring method as described above. The basic divided quantity may be set at 1 mg/shot for example. It is possible to choose another test characterization of the DOC device monitored, for example characterization of emissions thresholds, according to the information that is to be flagged up in the vehicle.

It may be seen that the test characterization is represented by a single value of a test quantity of fuel which constitutes a reliable, simple reference that takes up very little memory space in the engine control unit for example.

The method according to the invention can also be applied to lean-burn (richness<1) gasoline direct injection engines with three-way catalytic converters.

One example of a device according to the invention for monitoring the degradation of an oxidation catalysis device or DOC arranged in an exhaust line of an internal combustion engine of a vehicle comprises in the known way an oxidation catalysis device or DOC, means of successively injecting predetermined quantities of fuel in stages into the exhaust line, for example the system in place in the engine for injecting fuel into the cylinders to generate the engine torque comprising in the known way an engine control unit or ECU, means of measuring the outlet temperature of the oxidation catalysis device, for example a temperature sensor normally already in place in a vehicle fitted with a DOC device, means for determining the inlet temperature of the oxidation catalysis device, which are obtained via a temperature sensor or by modeling this temperature, means for flagging up in the vehicle a diagnosis of the DOC device, for example means for recording information in the OBD system. The device further comprises means for implementing the steps of a method as described above in the form of software executed in the engine control unit.

The invention claimed is:

1. A method for monitoring an oxidation catalysis device arranged in an exhaust line of an internal combustion engine of a vehicle, which comprises the following steps:
    activating said monitoring method during operation of the internal combustion engine in a predetermined range of inlet and outlet temperatures of the oxidation catalysis device,
    within said predetermined range of inlet temperatures, injecting predetermined successive quantities of fuel in stages at an inlet of said oxidation catalysis device, a predetermined quantity of fuel being injected for each stage, said predetermined quantity of fuel being greater than the quantity injected in the preceding stage,
    recording the outlet temperature of said oxidation catalysis device after each predetermined quantity of fuel injected per stage,
    recording a total quantity injected for a given stage, for which the outlet temperature of the oxidation catalysis device begins to decrease, for determining a characterization of said oxidation catalysis device monitored,
    comparing said determined characterization of the oxidation catalysis device monitored against a test characterization of a similar oxidation catalysis device which has been established beforehand in order to determine a threshold degradation of the oxidation catalysis device monitored that is not to be exceeded, then a diagnosis is established as follows:
        if said determined characterization puts said oxidation catalysis device monitored beyond said degradation threshold that is not to be exceeded, then a diagnosis of a malfunctioning of the oxidation catalysis device is flagged up in the vehicle, and
        if said determined characterization puts said oxidation catalysis device monitored under or at said degradation threshold that is not to be exceeded, then the diagnosis made is that the oxidation catalysis device is operational.

2. The monitoring method as claimed in claim 1, wherein said test characterization determines a total test quantity of fuel injected into a similar oxidation catalysis device which corresponds to said threshold degradation of the oxidation catalysis device monitored that is not to be exceeded.

3. The monitoring method as claimed in claim 1, wherein a scale of diagnosed degradation of the oxidation catalysis device monitored is established as a function of a quantification of the difference between the determined characterization and the test characterization, so that a measure of the degradation of the oxidation catalysis device monitored can be provided in the vehicle.

4. The monitoring method as claimed in claim 2, wherein a predetermined quantity of fuel injected into the exhaust line is obtained by dividing said test quantity of fuel into a plurality of divided quantities, the value of which is defined as a function of the desired fineness of the degradation diagnostics.

5. The monitoring method as claimed in claim 4, wherein, in each stage, the total quantity of fuel injected at the preceding stage is incremented by one said basic divided quantity.

6. The monitoring method as claimed in claim 2, wherein said total test quantity of fuel injected into a similar oxidation catalysis device which corresponds to the degradation threshold of the oxidation catalysis device monitored that is not to be exceeded is implemented in an electronic control unit of the vehicle.

7. The monitoring method as claimed in claim 2, wherein the preliminary establishing of said total test quantity of fuel injected into a similar oxidation catalysis device involves the following steps:
    causing the similar oxidation catalysis device to age, to a degradation limit the reference of which is sought in order to establish said threshold degradation of the oxidation catalysis device monitored that is not to be exceeded in said comparison step,
    the total quantity of fuel injected into said similar oxidation catalysis device, at this degradation limit, beyond which the outlet temperature of the oxidation catalysis device will decrease, and which defines said total test quantity of fuel is then recorded.

8. The monitoring method as claimed in claim 1, wherein said method is activated intrusively.

9. The monitoring method as claimed in claim 1, wherein said temperature recorded at the outlet of said oxidation catalysis device and which begins to decrease is comprised between 150° C. and 350° C.

10. A device for monitoring the degradation of an oxidation catalysis device arranged in an exhaust line of an internal combustion engine of a vehicle, comprising an oxidation catalysis device, means for successively injecting predetermined quantities of fuel in stages into the exhaust line, means for measuring the temperature at the outlet of said oxidation catalysis device, means for determining the inlet temperature of said oxidation catalysis device, wherein said device comprises means for implementing the steps of a method as claimed in claim 1.

11. The monitoring method as claimed in claim 3, wherein a predetermined quantity of fuel injected into the exhaust line is obtained by dividing said test quantity of fuel into a plurality of divided quantities, the value of which is defined as a function of the desired fineness of the degradation diagnostics.

12. The monitoring method as claimed in claim 11, wherein, in each stage, the total quantity of fuel injected at the preceding stage is incremented by one said basic divided quantity.

13. The monitoring method as claimed in claim 3, wherein said total test quantity of fuel injected into a similar oxidation catalysis device which corresponds to the degradation threshold of the oxidation catalysis device monitored that is not to be exceeded is implemented in an electronic control unit of the vehicle.

14. The monitoring method as claimed in claim 3, wherein the preliminary establishing of said total test quantity of fuel injected into a similar oxidation catalysis device involves the following steps:
  causing the similar oxidation catalysis device to age, to a degradation limit the reference of which is sought in order to establish said threshold degradation of the oxidation catalysis device monitored that is not to be exceeded in said comparison step,
  the total quantity of fuel injected into said similar oxidation catalysis device, at this degradation limit, beyond which the outlet temperature of the oxidation catalysis device will decrease, and which defines said total test quantity of fuel is then recorded.

* * * * *